United States Patent Office 3,497,363
Patented Feb. 24, 1970

3,497,363
MEAT CHIP
Jay B. Fox, Jr., 1233 Greenwood Ave.,
Wyncote, Pa. 19095
No Drawing. Filed Dec. 20, 1966, Ser. No. 603,394
Int. Cl. A23b 1/04
U.S. Cl. 99—208                1 Claim

ABSTRACT OF THE DISCLOSURE

A meat chip, a tasty, ready-to-eat source of protein that has desirable qualities of odor, crispness and chewability and excellent storage characteristics was prepared by deep-fat frying a thin slice of meat that has been previously frozen and freeze-dried. In addition to various kinds and grades of fresh and pickled meat, fish and shellfish were successfully processed. Taste panel results were used to establish optimal cooking conditions.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a new meat product and to the method for making such a product. More particularly, it relates to a convenient, ready-to-eat, high protein, delicious food treat, a meat chip, prepared from thin slices of a variety of meats such as beef, pork, lamb, fowl, lower grades of such meat, meat surpluses, fish and shellfish.

In a ready-to-eat product a number of desirable characteristics should be present. Foremost among these are that the flavor and odor are pleasing to the senses, especially those of taste and smell. Other features that favorably enhance its palatability are crispness and chewability. In addition, storage stability without the need for expensive packaging is also very desirable.

The healthful qualities of meat and fish protein as an article of diet are well recognized. It is common knowledge that many persons enjoy the flavor of meat and fish and prefer to obtain the protein in their diet from these sources rather than from other foods or dietary supplements. However, with few exceptions such as bologna, cooked ham and other delicatessen type items, meat and fish are consumed only at mealtimes and for the most part in a freshly prepared state such as roast beef, hamburger, roast lamb, roast turkey, fried chicken, roast pork, broiled halibut and other culinary delights.

One reason why meat and fish are usually consumed only at mealtimes is because of the forms in which they are available. Whereas some food items are available in convenient form, meat and fish are not usually prepared with a view to the convenience of the consumer. Fresh and cooked meat and fish cannot be classified in the category ordinarily referred to as snack foods, because they are difficult to handle and have a propensity to soil and stain clothing, hands and articles of furniture.

This invention is directed to the preparation of dried meat and fish products in a convenient and attractive form, and in a manner that will preserve the meat flavor. It is also the purpose of the invention to prepare a flavorful product with desirable qualities of odor, crispness and chewability, and one that has storage stability, yet does not need expensive packaging to prevent it from deteriorating in quality.

The term "meat" is employed to describe commodities such as beef, pork, lamb, chicken, turkey, veal, fish and shellfish and the like and when used hereafter applies to all of these commodities and includes all grades of these commodities. However, in this discussion the term is limited to the predominantly protein portion as opposed to the fat portion of such commodities.

It is an object of the invention to provide a meat preparation in the form of a chip.

It is a further object of the invention to provide a meat chip in a form convenient for packaging with special reference to the needs of marketing and consumption.

Another object of the invention is to make available a food product having beneficial nutritional properties, namely, a convenient and excellent source of protein.

A further object of the invention is to provide a meat product that will remain stable when stored without the benefit of refrigeration.

Another object of the invention is to prepare a tasty, ready-to-eat product that is pleasant to the sense of smell and that has a desirable degree of crispness and chewiness.

A still further object of the invention is to prepare a meat product that may be useful in other prepackaged convenience foods such as dry pack stews, soups, dinners and other similar commodities.

Other objects and a fuller understanding of the invention may be had by referring to the following description and claims.

Essentially, the product of the present invention is prepared by slicing meat either cross grain or with the grain, preferably the former, into relatively thin slices. These slices are first frozen and freeze-dried and then the freeze-dried slices are deep-fat fried to produce a crisp brown meat chip that has desirable flavor, odor and chewing consistency characteristics.

The process of this invention is superior to other methods of preparing dried food products and the reason for its superiority can be better understood by a consideration of the events that occur when plant and animal tissues are dried. When these tissues are dried in air, the cell walls collapse and the intracellular contents increase in viscosity proportionately with time until they become hard and eventually brittle. In fact, animal tissues become extremely hard and tough. When meat tissues are deep-fat fried water escapes readily from the tissues and the cell structure collapses producing essentially the same results as when animal tissues are air-dried. However, in many cases when vegetable tissues are fried in deep fat, the steam that is generated is confined by the relatively water impermeable cell walls thus causing expansion or at least maintenance of an open cell structure.

One of the principal advantages of the process of this invention is that water is removed from the meat slice by freeze-drying, leaving the cell structure open and in its original shape. When the freeze-dried meat slice is dropped into the hot oil, the oil penetrates the entire slice uniformly, cooks the proteins in place, fixes the shape of the resulting chip, and leaves an open structure of tissue that is crisp and chewable. Another advantage of the process is that the removal of water in the freeze-drying stage reduces or eliminates bacterial, mold, yeast, and other microbial spoilage.

In addition, several other advantages and novel features are inherent in the process. The process can be applied to various grades of meat as well as to a variety of meats and therefore could provide an outlet for meat surpluses and low grades of meat. The product is a high protein convenience meat staple that can be eaten directly from the package. The product has a very good shelf life at room temperature and is suitable for long term storage as an emergency meat ration. In addition, its stability and keeping quality make it useful as an ingredient in prepackaged convenience foods such as dry pack stews, soups and dinners.

The meat chips were evaluated by a taste panel which consisted of a minimum of eight and a maximum of eleven members. Although the panel members were not trained in any way, over half of the members had served on other taste panels. The panel members evaluated the chips for desirability, odor, flavor, crispness and chewability. They evaluated the first three characteristics on the basis of a hedonic scale, but they judged the last two characteristics, crispness and chewability, objectively according to the specific merits, rather than whether or not they particularly liked these qualities. Each panelist rated the various characteristics on a scale from 1 to 9 as follows: 1, very bad, repelled the panelist; 3, bad, disliked by panelist; 5, no opinion; 7, good, liked by panelist; 9, excellent, like very much by panelist.

The process by which the product of the invention is prepared is relatively simple. The particular type of meat is to be used in partially frozen (26° F.) in order to give the meat a stable consistency so that uniform slices may be obtained. It is then cut either cross grain or with the grain, preferably the former, into slices about 0.04 to 0.07 inch thick which are frozen, then freeze-dried. The freeze-dried slices are then deep-fat fried for 15 to 45 seconds at a temperature of 150 to 160° C. (302–320° F.). Any neutral edible oil that does not impart a flavor to the meat may be used as the deep-fat bath. Cottonseed oil is an example of a suitable fat for this purpose.

The removal of water in such a manner as to leave the cell structure of the meat open and in its original natural shape so that the oil can penetrate the entire slice uniformly is an important step in the preparation of this novel meat product. This is illustrated by comparing the product of this invention with products prepared in a similar maner but without this important step. For example, meat chips prepared from meat slices that had been freeze-dried before being deep-fat fried at 160° C. (320° F.) for 15 seconds were compared with products prepared from meat slices that had been frozen, but not freeze-dried before being deep-fat fried at 150° C. (302° F.) for one minute. The significant difference between the two products was in the crispness; the panel rated the cooked frozen meat slices 3.88 and the freeze-dried meat chips 7.44. The cooked frozen meat slices had the characteristics of fried minute steaks and were limp and soggy when cold. In addition, because of their high moisture content, they would not keep well at room temperature and could not be convenieintly packaged as a ready to eat food supplement.

Even with longer cooking times the moisture content of the cooked frozen meat slices could not be reduced to that of the freeze-dried meat chips (0.6% by Karl Fischer titration) cooked at 160° C. for 15 seconds. For example, frozen meat slices were deep-fat fried at 160° C. for 2½ and 4 minutes and although the products were much reduced in size and were very brittle and very dark and had a pronounced burnt flavor, the 4 minute product still had a moisture content of 3.0%. On all of the qualities except crispness the panel rated the cooked frozen meat slices between 4 and 5 and the freeze-dried chips between 6.5 and 7.5.

The optimal conditions of time and temperature of cooking, thickness of chip, direction of cutting of meat and whether or not the type of oil affected the final product were determined. The principal difficulty in establishing optimal times and temperatures of cooking is that there is a reciprocal relationship between these two factors which in a food product may produce almost identical results, or if the results are different, one product may appeal to one person and not to another. The reciprocal relationship is a real advantage because it means that the times and temperatures of cooking may be varied widely with no appreciable affect on the acceptability of a product.

All criteria, namely, desirability, odor, flavor, crispness and chewability indicated that optimal temperature of cooking was 150–160° C. (302–320° F.) and that 130° C. (266° F.) was too low. Preliminary tests, before the taste panel was used, showed that 170° C. (338° F.) was too high because shrinkage of the chip occurred, cooking times were highly critical, and a burnt flavor started to be noticeable.

Samples cooked at 160° C. for 15, 30 and 45 seconds were indistinguishable to the panel, indicating a relatively large degree of variation allowable in cooking time.

Samples were sliced on a Globe Model 201 slicing machine at settings of 0.5, 1.0 and 2.0 which gave slices 0.029, 0.060 and 0.088 inch thick respectively. There was no difference between the desirability, odor or flavor or the three thicknesses, but the thickest slice 0.088" was considered significantly less crisp and chewable. The thinnest slice, 0.029" was too delicate to handle easily and broke readily when picked up. The optimal thickness from an operational and desirability standpoint is about 0.04 to 0.07 inch.

Samples were cut both perpendicular and parallel to the grain of the meat. No difference in odor, flavor or chewability was noted between the two cuts, but a significant difference was noted in desirability and crispness. Although the panel rated both cuts desirable, they preferred the cross or perpendicular cut, especially with respect to the crispness factor.

Peanut oil was used in the initial cooking experiments, but it imparted to the meat a very heavy and cloying flavor and completely masked the meat flavor. Cottonseed oil was used in subsequent cooking experiments. The panel was unable to distinguish between and showed no preference for meat chips cooked in cottonseed oil and those cooked in corn oil. Therefore, a neutral oil should be used so that the normal meat flavor will not be masked.

The applicability of the process to various kinds of meats was ascertained by comparing chips made from beef, (good and commercial grades) lamb and pork, and also by comparing chips made from beef, lamb and pork that had been pickled in a 1.0% salt solution for nine days. All of the samples were highly rated (7.0 or above) in all qualities. In addition, chips made from fowl (breast of chicken), fish (halibut), and shellfish (shrimp) were found to be equal in all qualities to chips made from beef, lamb and pork.

The storage characteristics of the meat chips were determined by wrapping individual portions in aluminum foil, thereby sealing the chips from further exposure to the atmosphere and then storing the wrapped chips in air at a room temperature of about 70° F. When the chips were compared with freshly prepared chips at one, two and four weeks, no significant differences were noted between the stored and the freshly prepared chips.

I claim:

1. A process for the preparation of meat chips consisting of slicing partially-frozen meat into slices of about from 0.04 to 0.07 inch thickness, freezing the meat slices, freeze-drying the frozen meat slices, and deep-fat frying the freeze-dried meat slices, in a neutral edible oil which does not impart flavor to the meat slices, at a temperature of about from 302° to 320° F. for about from 15 to 45 seconds.

References Cited

UNITED STATES PATENTS

| | | | |
|---|---|---|---|
| 3,067,043 | 12/1962 | Marsh et al. | 99—208 |
| 3,150,978 | 9/1964 | Campfield. | |
| 3,169,070 | 2/1965 | Mehrlich et al. | 99—208 |
| 3,239,942 | 3/1966 | Mink et al. | |
| 3,253,931 | 5/1966 | Coleman et al. | 99—208 |

A. LOUIS MONACELL, Primary Examiner

W. C. LAWTON, Assistant Examiner

U.S. Cl. X.R.

99—107, 209